(12) United States Patent
Dale et al.

(10) Patent No.: US 7,062,571 B1
(45) Date of Patent: Jun. 13, 2006

(54) EFFICIENT IP LOAD-BALANCING TRAFFIC DISTRIBUTION USING TERNARY CAMS

(75) Inventors: Lincoln Dale, Melbourne (AU); Martin Cieslak, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 09/608,548

(22) Filed: Jun. 30, 2000

(51) Int. Cl.
*G06F 15/173* (2006.01)

(52) U.S. Cl. ...................... 709/239; 709/240

(58) Field of Classification Search ........ 709/238–242, 709/226–229, 105, 219; 711/108; 718/105
See application file for complete search history.

(56) References Cited

U.S. PATENT DOCUMENTS

| | | | |
|---|---|---|---|
| 5,136,580 A * | 8/1992 | Videlock et al. ............. | 370/403 |
| 5,386,413 A * | 1/1995 | McAuley et al. ........... | 370/392 |
| 5,414,704 A | 5/1995 | Spinney | |
| 5,473,607 A * | 12/1995 | Hausman et al. .......... | 370/392 |
| 5,488,412 A | 1/1996 | Majeti et al. | |
| 5,506,987 A | 4/1996 | Abramson et al. | |
| 5,566,170 A * | 10/1996 | Bakke et al. ................ | 370/392 |
| 5,586,121 A | 12/1996 | Moura et al. | |
| 5,696,976 A * | 12/1997 | Nizar et al. .................. | 710/266 |
| RE35,774 E | 4/1998 | Moura et al. | |
| 5,818,845 A | 10/1998 | Moura et al. | |
| 5,828,655 A | 10/1998 | Moura et al. | |
| 5,841,874 A * | 11/1998 | Kempke et al. ............ | 713/160 |
| 5,859,852 A | 1/1999 | Moura et al. | |
| 5,872,773 A | 2/1999 | Katzela et al. | |
| 5,892,903 A | 4/1999 | Klaus | |
| 5,946,047 A | 8/1999 | Levan | |
| 5,946,048 A | 8/1999 | Levan | |
| 5,950,205 A | 9/1999 | Aviani, Jr. | |
| 5,953,335 A | 9/1999 | Erimli et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |

(Continued)

FOREIGN PATENT DOCUMENTS

WO    WO98/31107    7/1998

OTHER PUBLICATIONS

Eager et al., "Adaptive Load Sharing in Homogeneous Distributed Systems," IEEE, Transactions on Software Engineering, vol. Se-12, No. 5, May 1986, pp. 662-675.

(Continued)

*Primary Examiner*—Bunjob Jaroenchonwanit
*Assistant Examiner*—Aaron Strange
(74) *Attorney, Agent, or Firm*—Beyer Weaver & Thomas, LLP (57) ABSTRACT

Disclosed is an apparatus and method for distributing traffic to one or more selected cache systems or servers. In general terms, a content addressable memory (e.g., a TCAM) is utilized to distribute traffic among a plurality of cache systems or servers. The content addressable memory is populated with a plurality of entries. Each entry within the content addressable memory generally indicates an action to be performed on a packet, such as to redirect the packet or to forward the packet to its original destination. When the action indicated by the content addressable memory is to redirect the packet, the content addressable memory also indicates where (e.g., to which cache system) to redirect the packet.

37 Claims, 9 Drawing Sheets

U.S. PATENT DOCUMENTS

| | | | |
|---|---|---|---|
| 5,989,060 | A | 11/1999 | Coile et al. |
| 6,006,266 | A | 12/1999 | Murphy et al. |
| 6,016,388 | A | 1/2000 | Dillon |
| 6,052,718 | A | 4/2000 | Gifford |
| 6,073,168 | A * | 6/2000 | Mighdoll et al. ............ 709/217 |
| 6,134,135 | A * | 10/2000 | Andersson .................... 365/49 |
| 6,138,162 | A * | 10/2000 | Pistriotto et al. ............ 709/229 |
| 6,154,384 | A * | 11/2000 | Nataraj et al. ................. 365/49 |
| 6,157,644 | A * | 12/2000 | Bernstein et al. ........... 370/392 |
| 6,167,438 | A * | 12/2000 | Yates et al. .................. 709/216 |
| 6,243,360 | B1 * | 6/2001 | Basilico ....................... 709/250 |
| 6,345,294 | B1 | 2/2002 | O'Toole et al. |
| 6,389,462 | B1 * | 5/2002 | Cohen et al. ............... 709/218 |
| 6,453,358 | B1 * | 9/2002 | Michels et al. ............. 709/238 |
| 6,490,632 | B1 * | 12/2002 | Vepa et al. .................. 709/250 |
| 6,510,509 | B1 * | 1/2003 | Chopra et al. .............. 709/236 |
| 6,560,670 | B1 * | 5/2003 | Ichiriu ......................... 711/108 |
| 6,594,260 | B1 * | 7/2003 | Aviani et al. ................ 709/203 |
| 6,633,563 | B1 * | 10/2003 | Lin et al. ..................... 370/389 |
| 6,760,765 | B1 * | 7/2004 | Asai et al. ................... 709/226 |
| 6,763,394 | B1 * | 7/2004 | Tuck et al. .................. 709/238 |
| 6,973,082 | B1 * | 12/2005 | Devi et al. ................... 370/390 |

OTHER PUBLICATIONS

Akamai Technologies, Inc. -Global Internet Content Delivery-"How FreeFlow Works," webmaster@akamai.com 1999-2000.

Digital Island, Inc. -e-Business Without Limits-, "Enabling Technologies," http://www.digisle.net., no date.

Internap, "Preferred Collocation Services," http://www.internap.com Copyright © 2001 Internap Network Services Corporation.

Meyer, et al., Request For Comments No. 2026, entitled, "Generic Routing Encapsulation (GRE)," Jan., 2000, Internet Engineering Task Force, 9 pages.

Mockapetris, P., Request For Comments No. 1034, entitled, "Domain Names—Concepts and Facilities," Nov., 1987, Internet Engineering Task Force, 31 pages.

Information Sciences Institute, Request for Comments No. 793, entitled, "Transmission Control Protocol—DARPA Internet Program—Protocol Specification," Sep., 1981, Internet Engineering Task Force, 49 pages.

David M. Gifford, "Replica Routing," U.S. Appl. No. 09/472,964, filed Dec. 28, 1999, 37 Pages.

Johnson et al., "Dynamic Server Organization," U.S. Appl. No. 09/294,837, filed Apr. 19, 1999, 42 Pages.

Lu et al., "Automatic Network Addresses Assignment and Translation Interference," U.S. Appl. No.: 60/160,535, filed Oct. 20, 1999, 127 Pages.

Lu et al., "Method and Apparatus for Automatic Network Address Assignment," U.S. Appl. No.: 60/178,063, filed Jan. 24, 2000, 74 Pages.

Johnson et al., "Method and Apparatus for Determining a Network Topology in the Presence of Network Address Translation," U.S. Appl. No.: 60/178,062, filed Jan. 24, 2000, 32 Pages.

Toole et al., "Fast-Changing Network Status and Load Monitoring and Feedback," U.S. Appl. No.: 60/177,985, filed Jan. 25, 2002, 20 Pages.

Kirk Johnson, "A Method and Apparatus for Minimalist Approach to Implementing Server Selection," U.S. Appl. No.: 60/177,415, filed Jan. 21, 2000, 39 Pages.

* cited by examiner

| Bits-to-Match | Action | Redirection Destination |
|---|---|---|
| xx00 0000 | Redirect | Cache0 |
| xx00 0001 | Redirect | Cache1 |
| xx00 0010 | Redirect | Cache2 |
| xx00 0011 | Redirect | Cache3 |
| ⋮ | ⋮ | ⋮ |
| xx11 1100 | Forward | |
| xx11 1101 | Redirect | Cache1 |
| xx11 1110 | Redirect | Cache2 |
| xx11 1111 | Redirect | Cache3 |

Fig. 4 bucket 0: h=00000000000000000000000000000000
bucket 1: h=00000000000000000001000000000000
bucket 2: h=00000000000000000000010000000000
bucket 3: h=00000000000000000001010000000000
bucket 4: h=00000000000000000000001000000000
bucket 5: h=00000000000000000001001000000000
bucket 6: h=00000000000000000000011000000000
bucket 7: h=00000000000000000001011000000000
bucket 8: h=00000000000000000000000100000000
bucket 9: h=00000000000000000001000100000000
bucket 10: h=00000000000000000000010100000000
bucket 11: h=00000000000000000001010100000000
bucket 12: h=00000000000000000000001100000000
bucket 13: h=00000000000000000001001100000000
bucket 14: h=00000000000000000000011100000000
bucket 15: h=00000000000000000001011100000000
bucket 16: h=00000000000000000000000001000000
bucket 17: h=00000000000000000001000001000000
bucket 18: h=00000000000000000000010001000000
bucket 19: h=00000000000000000001010001000000
bucket 20: h=00000000000000000000001001000000
bucket 21: h=00000000000000000001001001000000
bucket 22: h=00000000000000000000011001000000
bucket 23: h=00000000000000000001011001000000
bucket 24: h=00000000000000000000000101000000
bucket 25: h=00000000000000000001000101000000
bucket 26: h=00000000000000000000010101000000
bucket 27: h=00000000000000000001010101000000
bucket 28: h=00000000000000000000001101000000
bucket 29: h=00000000000000000001001101000000
bucket 30: h=00000000000000000000011101000000
bucket 31: h=00000000000000000001011101000000
bucket 32: h=00000000000000000000000000000001
bucket 33: h=00000000000000000001000000000001
bucket 34: h=00000000000000000000010000000001
bucket 35: h=00000000000000000001010000000001
bucket 36: h=00000000000000000000001000000001
bucket 37: h=00000000000000000001001000000001
bucket 38: h=00000000000000000000011000000001
bucket 39: h=00000000000000000001011000000001
bucket 40: h=00000000000000000000000100000001
bucket 41: h=00000000000000000001000100000001
bucket 42: h=00000000000000000000010100000001
bucket 43: h=00000000000000000001010100000001
bucket 44: h=00000000000000000000001100000001

Fig. 5A bucket 45: h=00000000000000000010011000000001
bucket 46: h=00000000000000000001110000000 1
bucket 47: h=00000000000000000001011100000001
bucket 48: h=00000000000000000000000001000001
bucket 49: h=00000000000000000001000001000001
bucket 50: h=00000000000000000000010001000001
bucket 51: h=00000000000000000001010001000001
bucket 52: h=00000000000000000000001001000001
bucket 53: h=00000000000000000001001001000001
bucket 54: h=00000000000000000000011001000001
bucket 55: h=00000000000000000001011001000001
bucket 56: h=00000000000000000000000101000001
bucket 57: h=00000000000000000001000101000001
bucket 58: h=00000000000000000000010101000001
bucket 59: h=00000000000000000001010101000001
bucket 60: h=00000000000000000001001101000001
bucket 62: h=00000000000000000000011101000001
bucket 63: h=00000000000000000001011101000001

Fig. 5B bucket 0: h=00000000000000000000000000000000
bucket 1: h=00000000000000000001000000000000
bucket 2: h=00000000000000000000010000000000
bucket 3: h=00000000000000000001010000000000
bucket 4: h=00000000000000000000001000000000
bucket 5: h=00000000000000000001001000000000
bucket 6: h=00000000000000000000011000000000
bucket 7: h=00000000000000000001011000000000
bucket 8: h=00000000000000000000000100000000
bucket 9: h=00000000000000000001000100000000
bucket 10: h=00000000000000000000010100000000
bucket 11: h=00000000000000000001010100000000
bucket 12: h=00000000000000000000001100000000
bucket 13: h=00000000000000000001001100000000
bucket 14: h=00000000000000000000011100000000
bucket 15: h=00000000000000000001011100000000
bucket 16: h=00000000000000000000000001000000
bucket 17: h=00000000000000000001000001000000
bucket 18: h=00000000000000000000010001000000
bucket 19: h=00000000000000000001010001000000
bucket 20: h=00000000000000000000001001000000
bucket 21: h=00000000000000000001001001000000
bucket 22: h=00000000000000000000011001000000
bucket 23: h=00000000000000000001011001000000
bucket 24: h=00000000000000000000000101000000
bucket 25: h=00000000000000000001000101000000
bucket 26: h=00000000000000000000010101000000
bucket 27: h=00000000000000000001010101000000
bucket 28: h=00000000000000000000001101000000
bucket 29: h=00000000000000000001001101000000
bucket 30: h=00000000000000000000011101000000
bucket 31: h=00000000000000000001011101000000
bucket 32: h=00000000000000000000000000000100
bucket 33: h=00000000000000000001000000000100
bucket 34: h=00000000000000000000010000000100
bucket 35: h=00000000000000000001010000000100
bucket 36: h=00000000000000000000001000000100
bucket 37: h=00000000000000000001001000000100
bucket 38: h=00000000000000000000011000000100
bucket 39: h=00000000000000000001011000000100
bucket 40: h=00000000000000000000000100000100
bucket 41: h=00000000000000000001000100000100
bucket 42: h=00000000000000000000010100000100
bucket 43: h=00000000000000000001010100000100
bucket 44: h=00000000000000000000001100000100

Fig. 6A bucket 45: h=00000000000000000001001100000100
bucket 46: h=00000000000000000000011100000100
bucket 47: h=00000000000000000001011100000100
bucket 48: h=00000000000000000000000001000100
bucket 49: h=00000000000000000001000001000100
bucket 50: h=00000000000000000000010001000100
bucket 51: h=00000000000000000001010001000100
bucket 52: h=00000000000000000000001001000100
bucket 53: h=00000000000000000001001001000100
bucket 54: h=00000000000000000000011001000100
bucket 55: h=00000000000000000001011001000100
bucket 56: h=00000000000000000000000101000100
bucket 57: h=00000000000000000001000101000100
bucket 58: h=00000000000000000000010101000100
bucket 59: h=00000000000000000001010101000100
bucket 60: h=00000000000000000000001101000100
bucket 61: h=00000000000000000001001101000100
bucket 62: h=00000000000000000000011101000100
bucket 63: h=00000000000000000001011101000100
bucket 64: h=00000000000000000000000000000001
bucket 65: h=00000000000000000001000000000001
bucket 66: h=00000000000000000000010000000001
bucket 67: h=00000000000000000001010000000001
bucket 68: h=00000000000000000000001000000001
bucket 69: h=00000000000000000001001000000001
bucket 70: h=00000000000000000000011000000001
bucket 71: h=00000000000000000001011000000001
bucket 72: h=00000000000000000000000100000001
bucket 73: h=00000000000000000001000100000001
bucket 74: h=00000000000000000000010100000001
bucket 75: h=00000000000000000001010100000001
bucket 76: h=00000000000000000000001100000001
bucket 77: h=00000000000000000001001100000001
bucket 78: h=00000000000000000000011100000001
bucket 79: h=00000000000000000001011100000001
bucket 80: h=00000000000000000000000001000001
bucket 81: h=00000000000000000001000001000001
bucket 82: h=00000000000000000000010001000001
bucket 83: h=00000000000000000001010001000001
bucket 84: h=00000000000000000000001001000001
bucket 85: h=00000000000000000001001001000001
bucket 86: h=00000000000000000000011001000001
bucket 87: h=00000000000000000001011001000001
bucket 88: h=00000000000000000000000101000001
bucket 89: h=00000000000000000001000101000001

Fig. 6B bucket 90: h=00000000000000000000010101000001
bucket 91: h=00000000000000000001010101000001
bucket 92: h=00000000000000000000001101000001
bucket 93: h=00000000000000000001001101000001
bucket 94: h=00000000000000000000011101000001
bucket 95: h=00000000000000000001011101000001
bucket 96: h=00000000000000000000000000000101
bucket 97: h=00000000000000000001000000000101
bucket 98: h=00000000000000000000010000000101
bucket 99: h=00000000000000000001010000000101
bucket 100: h=00000000000000000000001000000101
bucket 101: h=00000000000000000001001000000101
bucket 102: h=00000000000000000000011000000101
bucket 103: h=00000000000000000001011000000101
bucket 104: h=00000000000000000000000100000101
bucket 105: h=00000000000000000001000100000101
bucket 106: h=00000000000000000000010100000101
bucket 107: h=00000000000000000001010100000101
bucket 108: h=00000000000000000000001100000101
bucket 109: h=00000000000000000001001100000101
bucket 110: h=00000000000000000000011100000101
bucket 111: h=00000000000000000001011100000101
bucket 112: h=00000000000000000000000001000101
bucket 113: h=00000000000000000001000001000101
bucket 114: h=00000000000000000000010001000101
bucket 115: h=00000000000000000001010001000101
bucket 116: h=00000000000000000000001001000101
bucket 117: h=00000000000000000001001001000101
bucket 118: h=00000000000000000000011001000101
bucket 119: h=00000000000000000001011001000101
bucket 120: h=00000000000000000000000101000101
bucket 121: h=00000000000000000001000101000101
bucket 122: h=00000000000000000000010101000101
bucket 123: h=00000000000000000001010101000101
bucket 124: h=00000000000000000000001101000101
bucket 125: h=00000000000000000001001101000101
bucket 126: h=00000000000000000000011101000101
bucket 127: h=00000000000000000001011101000101

Fig. 6C

EFFICIENT IP LOAD-BALANCING TRAFFIC DISTRIBUTION USING TERNARY CAMS

BACKGROUND OF THE INVENTION

The present invention relates to transmission of data in a network environment. More specifically, the present invention relates to methods and apparatus for efficiently redirecting or distributing network traffic.

Current traffic distribution or load-balancing algorithms are based on metrics such as "round robin" or "weighted round robin", "least connections", and "fastest response." Round robin generally sequentially distributes traffic portions to each available destination site or server. For example, a first traffic portion goes to a first server; a second portion goes to a second server; etc. After a traffic portion goes to the last available server, the next traffic portion is then distributed to the first server. In the weighted round robin approach, each server has an associated weight value that dictates how large a traffic portion is received by such server during its turn. The least connections approach generally distributes traffic to the server that currently has the least number of connections. The fast response approach distributes traffic to the server that responds the quickest to a service request.

Although these techniques are adequate for certain applications, they all require per flow state information to be kept. When the traffic level (e.g., to the switch) is high, the number of simultaneous flows is also high. Accordingly, these techniques may then consume a relatively large amount of resources to keep the per flow state information. For example, a relatively large amount of memory is utilized.

Network caching represents another distribution technique. By altering the operating system code of an existing router or switch, the router or switch is enabled to recognize and redirect data traffic having particular characteristics such as, for example, a particular protocol intended for a specified port (e.g., TCP with port 80), to one or more network caches connected to the router via an interface having sufficient bandwidth. If there are multiple caches connected to the cache-enabled router, the router selects from among the available caches for a particular request based on the destination IP address specified in the packet. An example of such a network caching technique is embodied in the Web Cache Coordination Protocol (WCCP) provided by Cisco Systems, Inc., a specific embodiment of which is described in copending, commonly assigned, U.S. patent application Ser. No. 08/946,867 for METHOD AND APPARATUS FOR FACILITATING NETWORK DATA TRANSMISSIONS filed Oct. 8, 1997, the entirety of which is incorporated herein by reference for all purposes.

Another specific embodiment of a packet redirection protocol which may be used to implement a network redirection technique is described in copending, commonly assigned, U.S. Provisional Patent Application No. 60/168,862 for METHOD AND APPARATUS FOR REDIRECTING NETWORK TRAFFIC filed Dec. 2, 1999, the entirety of which is incorporated herein by reference for all purposes. According to a specific embodiment described in that application, the network caches have the capability of determining that particular redirected packets should be transmitted back to the redirecting router and reinserted into the original traffic flow. This may be done in a manner transparent to the source or destination of the packets. An example of a case in which packets would need to be reinserted in the original flow might be where the cache recognizes the source and destination pairs identified by the packets as corresponding to a connection requiring IP-based authentication. Another example would be where the cache is overloaded and is currently unable to handle all of the redirected traffic.

In the above described WCCP techniques, a cache system to which a particular packet is redirected is selected based on the contents of the particular packet. The four bytes of the destination address of the particular packet are XOR'ed together. The XOR result is then used as an index to a redirection table. In other words, the index is compared to a plurality of index values within the redirection table. When a matching index is found, the matching index corresponds to a particular cache system. The packet is then redirected to the corresponding cache system.

Although this cache system selection technique works well in certain applications, it is too slow in other applications that require relatively fast redirection since the technique is currently implemented in software. That is, the XOR'ing and matching procedures take a relatively high number of clock cycles to complete. Additionally, it is not practical to implement the cache system selection techniques within hardware (e.g., within an ASIC) since the design time for an ASIC typically takes about 18 months. Each change to the cache selection or distribution algorithms would then require a new ASIC design. In sum, a hardware implementation for the cache system distribution techniques would be too time-consuming and costly.

Therefore, there is a need for more efficient traffic distribution techniques that also provide flexible redesign capabilities.

SUMMARY OF THE INVENTION

Accordingly, the present invention provides an apparatus and method for distributing traffic to one or more selected cache systems or servers. In general terms, a content addressable memory (e.g., a TCAM) is utilized to distribute traffic among a plurality of cache systems or servers. The content addressable memory is populated with a plurality of entries. Each entry within the content addressable memory generally indicates an action to be performed on a packet, such as to redirect the packet or to forward the packet to its original destination. When the action indicated by the content addressable memory is to redirect the packet, the content addressable memory also indicates where (e.g., to which cache system) to redirect the packet.

In one embodiment, a method of distributing packets among a plurality of processing devices (e.g., cache systems and/or servers) is disclosed. A packet is received (e.g., within a switch). One or more portions of the packet are then input into a content addressable memory. The content addressable memory outputs a result in response to the input packet portions. The result indicates that the packet is to be sent to a selected processing device. The received packet is then sent to the indicated processing device. For example, the result indicates whether to forward the packet to its original destination or to redirect the packet to a selected cache system. By way of another example, the result simply indicates to which processing device or server to send the packet.

In another method aspect, a plurality of entries are generated within a content addressable memory. Each entry includes a set of bit values that correspond to one or more portions of a packet. Each entry also includes one or more destination fields indicating where to send a packet that matches the entry's set of bit values. Preferably, the destination fields include an action field indicating whether to redirect the packet from a destination indicated by the packet itself. Preferably, the destination fields also include a destination identifier identifying or indicating a device to which the packet is to be redirected. In another aspect, the set of bits values include at least a 1 or a 0 value and a "don't care" value.

In another embodiment, the invention pertains to a computer system operable to distribute traffic. The computer system includes a first memory, a content addressable memory, and a processor coupled to the first memory and the content addressable memory. The first memory and the processor are adapted to provide at least some of the above described method operations. In yet a further embodiment, the invention pertains to a computer program product for distributing traffic. The computer program product has at least one computer readable medium and a computer program instructions stored within the at least one computer readable product configured to cause a processing device to perform at least some of the above described method operations.

These and other features and advantages of the present invention will be presented in more detail in the following specification of the invention and the accompanying figures which illustrate by way of example the principles of the invention.

BRIEF DESCRIPTION OF THE DRAWINGS

FIGS. 6A through 6C illustrate a specific TCAM configuration in accordance with a second embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
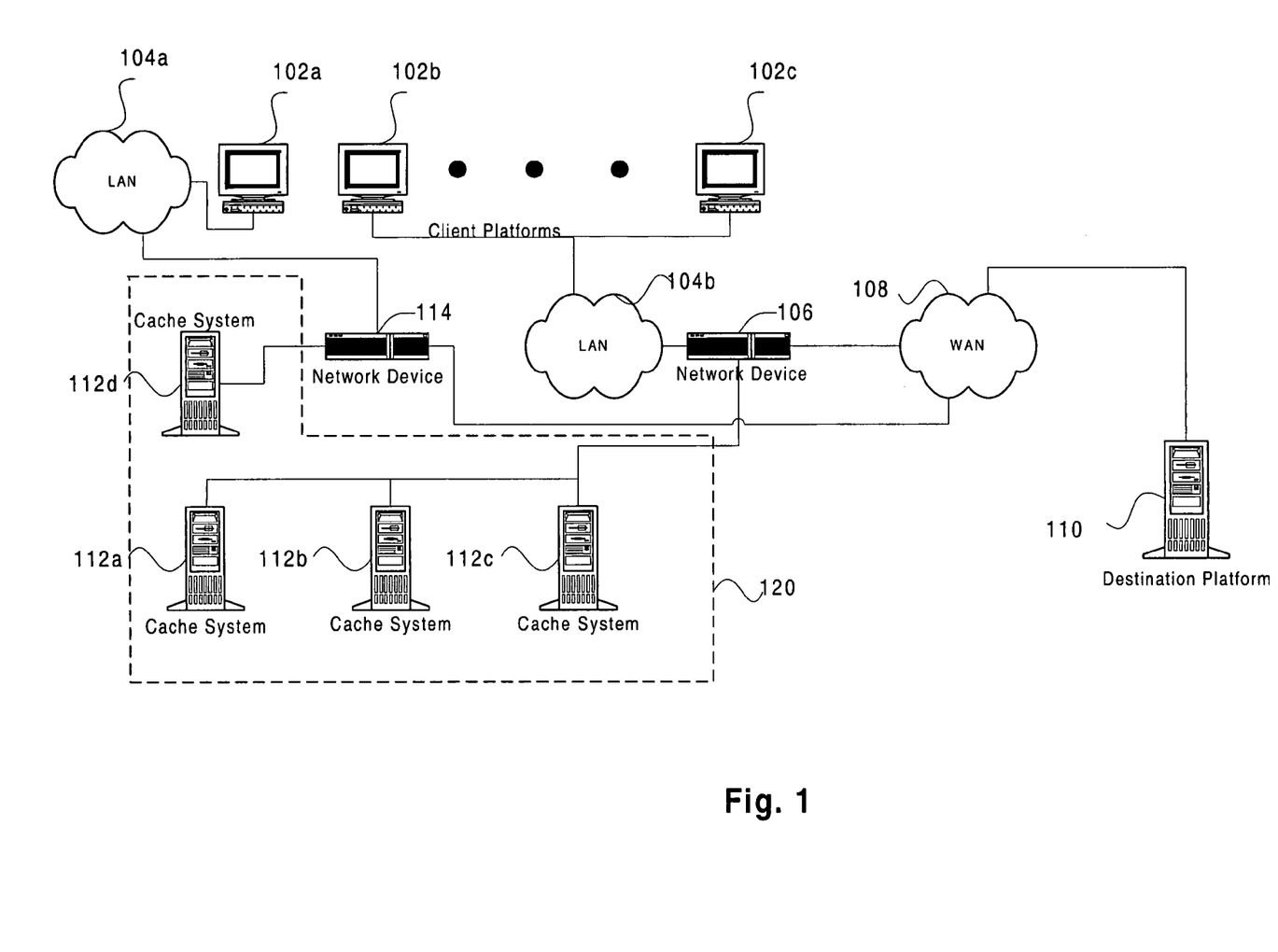
FIG. 1 is a network diagram illustrating cache clusters according to a specific embodiment of the present invention.
Figure 2:
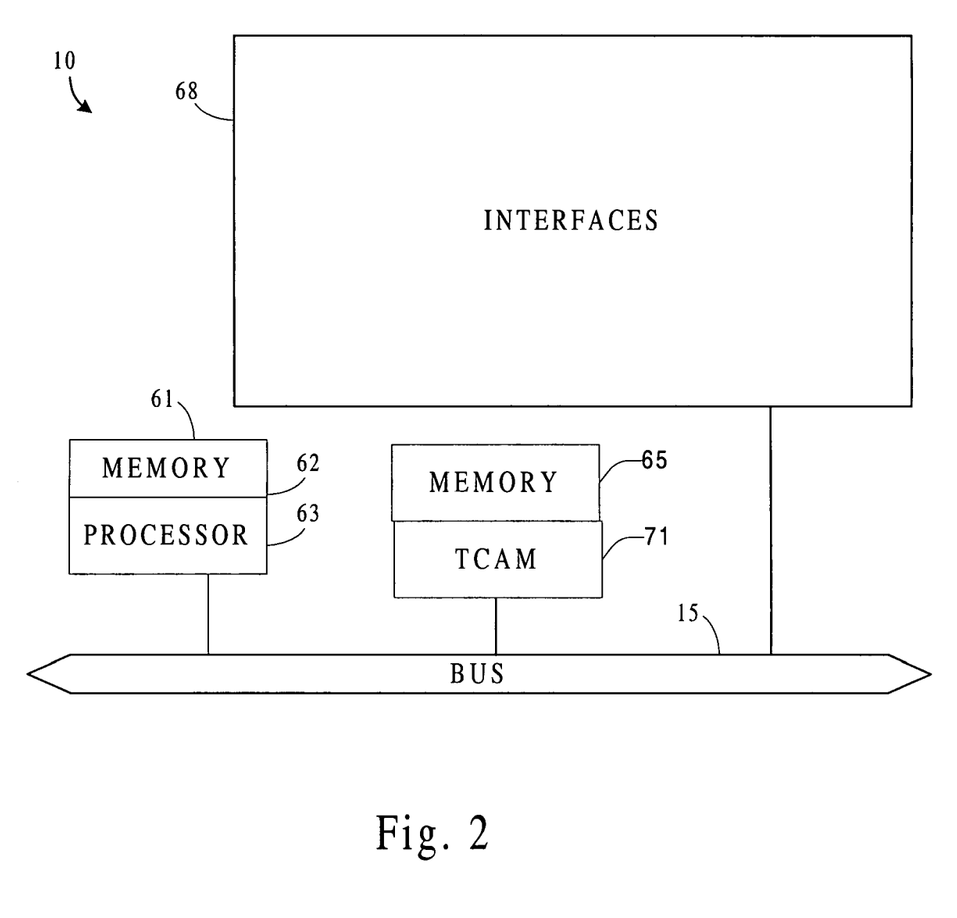
FIG. 2 is a diagrammatic representation of a network device in accordance with one embodiment of the present invention.
Figure 3:
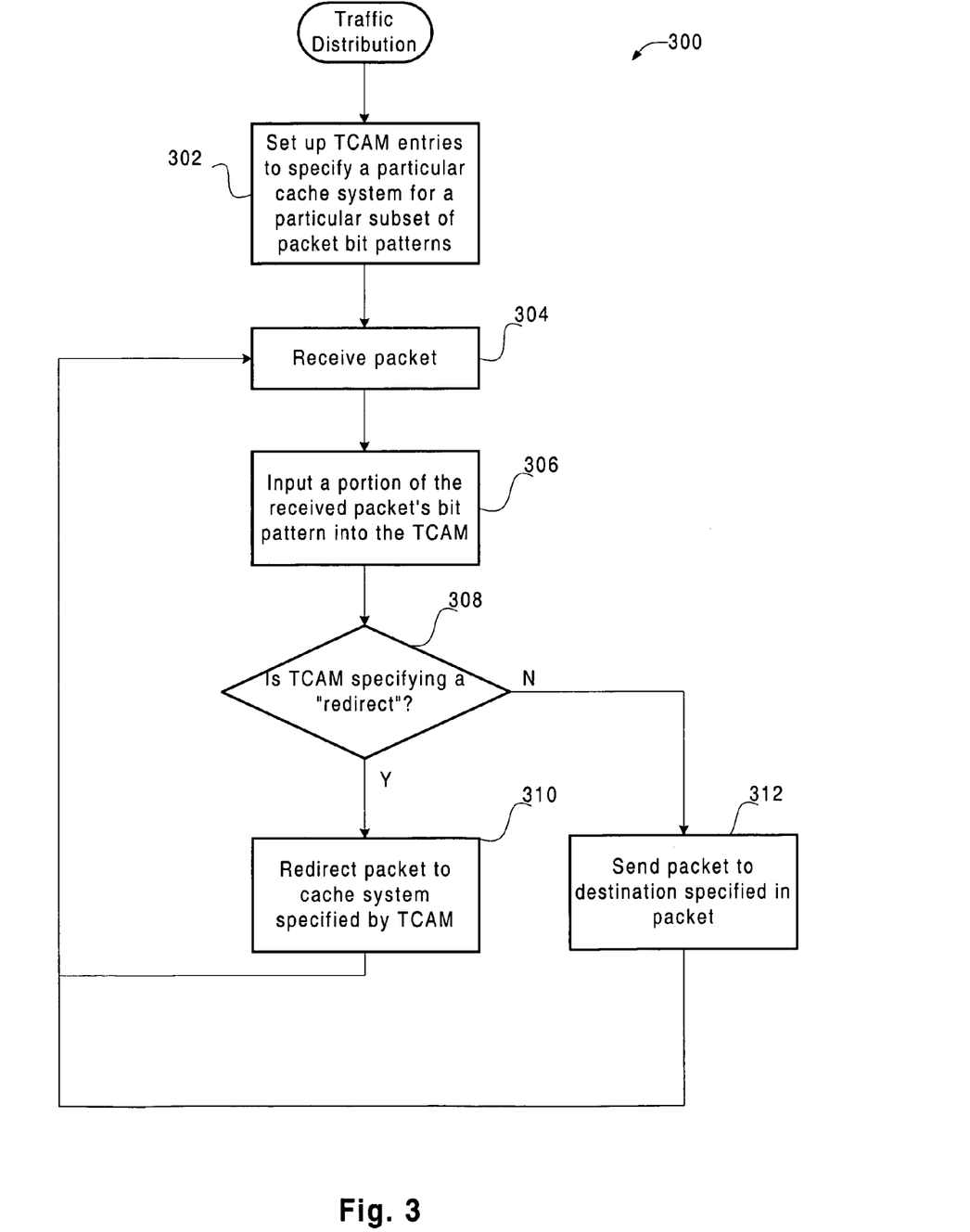
FIG. 3 is a flow chart illustrating a traffic distribution procedure in accordance with one embodiment of the present invention.
Figure 4:
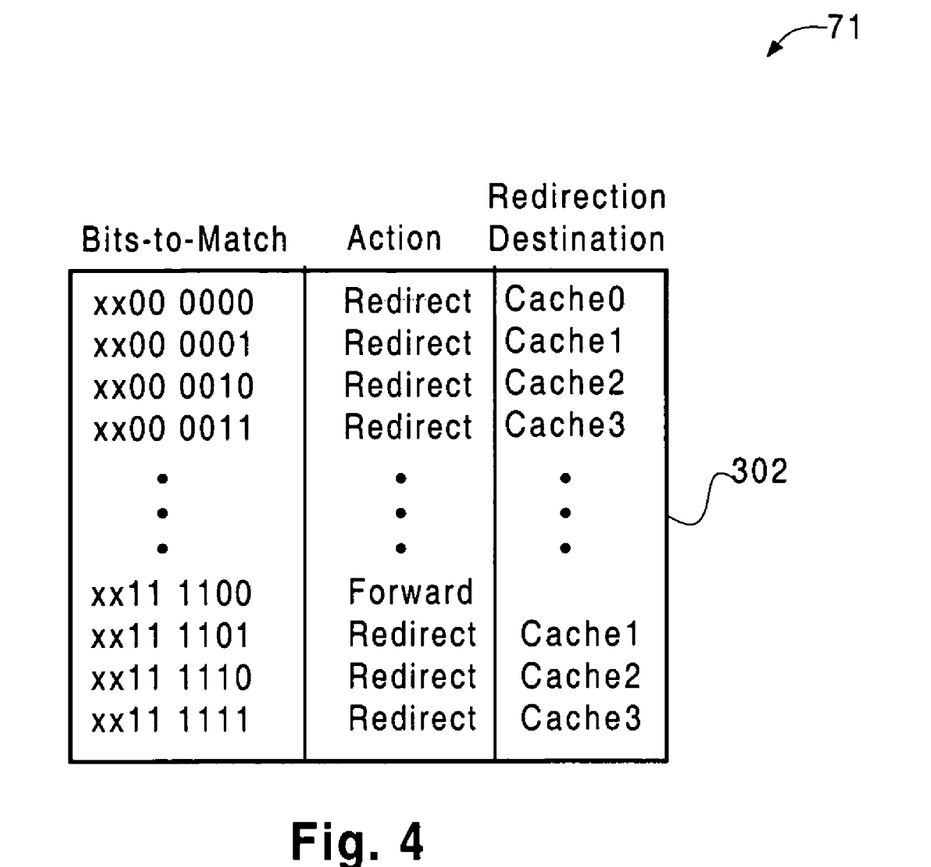
FIG. 4 illustrates a simplified example TCAM configuration in accordance with one embodiment of the present invention.

FIG. 1 is a simplified network diagram which will be used in conjunction with the diagrams of FIGS. 2 and 4 and the flowchart of FIG. 3 to describe specific embodiments of the present invention. As shown, a plurality of client machines 102 which are resident on one or more local area networks (LAN) 104 communicate via network device 106 (e.g., a router or switch) or network device 114 and wide area network (WAN) 108, e.g., the internet, with server 110. Of course, some or all of the clients 102 may communicate with the network device 106 or network device 114 through various other configurations, rather than through a LAN. For example, a client may be coupled directly to the network device 106 or there may be one or more intermediate network devices between a client 102 and the network device 106.

The network device 106 may redirect certain traffic, e.g., destined for port 80, to a cache system, such as 112a, which is configured to "spoof" server 110 or provide any number and type of service(s). If there are multiple caches connected to the cache-enabled network device, the network device selects from among the available caches for a particular request based on portions of the packet's content. For example, a first set of destination IP addresses may be assigned to cache system 112a; a second set of IP addresses to cache system 112b; a third set of IP addresses to cache system 112c; and a fourth set of IP addresses to cache system 112d.

In one configuration, the selected cache system 112a may respond to a request from a client 102 to obtain objects from destination platform 110. The cache system 112a either retrieves objects from destination platform 110 to then present to one of the clients or retrieves objects from its own cache (which objects were previously retrieved from the destination platform 110). It will be understood that the network cache systems described herein may employ any of a variety of existing file systems and remain within the scope of the invention. For example, the invention may be implemented using a Unix general purpose file system or the equivalent. A particular embodiment of the invention employs the file system described in commonly assigned, U.S. Pat. No. 5,950,205 for DATA TRANSMISSION OVER THE INTERNET USING A CACHE MEMORY FILE SYSTEM issued on Sep. 7, 1999, the entire specification of which is incorporated herein by reference for all purposes.

In the illustrated embodiment, cache systems 112a, 112b, 112c, and 112d form a cache cluster or farm 120. Traffic is typically allocated to each cache system within the same cache cluster. Traffic may be allocated based on any suitable factor. In one embodiment, traffic is allocated based on IP destination address. That is, each cache system is assigned to handle requests for objects from a particular set of destination addresses. The present invention provides mechanisms for intelligently assigning traffic to each cache system within a cluster via a TCAM. Of course, any other suitable hardware device may be utilized that allows high speed traffic distribution. For example, a non-ternary CAM may be utilized.

Although the present invention is described in terms of distributing traffic among a plurality of "cache" systems, of course, the distribution techniques may be applied to any kind of devices, such as general purpose devices or servers that provide services other than caching. In other words, the traffic distribution techniques may be implemented on any suitable a network device designed to handle network traffic. Such network devices typically have multiple network interfaces including frame relay and ISDN interfaces, for example. Specific examples of such network devices include routers and switches. For example, the traffic distribution systems of this invention may be a specially configured switch such as the 6000, 5000, and 4000 Series Catalyst switches available from Cisco Systems, Inc. of San Jose, Calif. A general architecture for some of these machines will appear from the description given below. In an alternative embodiment, the traffic distribution system may be implemented on a general-purpose network host machine such as a personal computer or workstation. Further, the invention may be at least partially implemented on a card (e.g., an interface card) for a network device or a general-purpose computing device.

Referring now to FIG. 2, a network device 10 suitable for implementing the present invention includes a master central processing unit (CPU) 62, interfaces 68, and a bus 15 (e.g., a PCI bus). By way of example, the network device may be a switch or bridge device, which is utilized to switch packets between various subsets of interfaces that belong to a same LAN. In one embodiment, the switch determines where to send a packet based on the packet's MAC (media access controller) address. By way of another example, the network device may be a router capable of forwarding packets between different LAN's (e.g., providing Layer 3 functionality). Of course, the designations switch, bridge, and router are becoming increasingly fluid. For example, many switches also provide Layer 3 functionality.

When acting under the control of appropriate software or firmware, the CPU 62 is responsible for such router tasks as routing table computations and network management. It may also be responsible for determining where to redirect or forward packets received into the switch (e.g., to a particular cache system 112 or main server 110) and then implementing such redirection or forwarding. The network device 10 preferably accomplishes all these functions under the control of software including an operating system (e.g., the Internetwork Operating System (IOS®) of Cisco Systems, Inc., the Linux Operating System, or any other OS) and any appropriate applications software. CPU 62 may include one or more processors 63 such as a processor from the Motorola family of microprocessors, the Intel family of microprocessors, or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 2 is one specific network device of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or traffic distribution mechanisms described herein. The program instructions may control the operation of an operating system and/or one or more applications, for example. The memory or memories may also be configured to store availability information regarding each cache system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM), flash memory, or random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

In the illustrated embodiment, the memory also includes a ternary content addressable memory (TCAM). In general terms, the TCAM is used to redirect traffic to a selected cache system or forward the traffic to its original destination (e.g., the main server 110). The TCAM provides a mechanism for quickly looking up whether to redirect a packet and to where to redirect such packet. A TCAM can typically perform this lookup function in a single clock cycle. Accordingly, a TCAM solution represents an efficient mechanism for traffic distribution.

FIG. 3 is a flow chart illustrating a traffic distribution procedure 300 in accordance with one embodiment of the present invention. Initially, TCAM entries are set up in operation 302. At least some of the TCAM entries specify a particular cache system for a matching bit pattern of one or more packet portions. Other TCAM entries may specify that the packet will not be redirected to a cache system, but simply forwarded to its original destination. The TCAM may be implemented by any suitable network component, such as a cache system or the network device itself. Preferably, a cache system is designated to assign traffic to the cluster cache systems. In a specific embodiment, the cluster cache system having the lowest IP address is the designated cache system.

The TCAM may be set up in any suitable configuration so that a portion of the packet bit pattern may be input into the TCAM to thereby result in a decision being output from the TCAM specifying how to distribute such packet. FIG. 4 illustrates a simplified example TCAM configuration in accordance with one embodiment of the present invention. As shown, each entry includes three fields: a Bits-To-Match field, an Action field, and a Redirection Destination field. In the illustrated embodiment, the Bits-To-Match field corresponds to at least a portion of the packet. For example, the Bits-To-Match field of FIG. 4 corresponds to the low order byte of a packet's destination address. However, other embodiments may cover other portions of the packet or sets of portions. Since the TCAM is ternary, each entry's Bits-To-Match field may have any suitable combination of 1, 0, and "don't care" values. A "don't care" value indicates that the corresponding bit may have either a 1 or a 0 value. Thus, each entry specifies a 1, 0, or "don't care" for each corresponding bit within the packet portion. As shown, the two higher order bits for each entry have "don't care" values. In this example, there are then 26 entries for each combination of bit values for the lower six bits.

Each entry's Action field specifies how to handle or distribute the packet. The Action field may indicate that the packet is to be redirected to a cache system, forwarded to its original destination, dropped, etc. As shown, when the low order byte of the destination address of a packet equals "xx00 0000", the packet is to be redirected to a cache system. In contrast, when it equals "xx11 1100", the packet is to be forwarded to its original destination. In the latter case, the Redirection Destination field may be blank (or unused) or specify the original destination address. Each entry's Redirection Destination field may then be used to identify, either indirectly or directly, where the packet is to be redirected when the Action field indicates "redirect." In one embodiment, the Redirection Destination field is in the form of a cache system identification. As shown, when the low order byte of a packet's destination address equals "0000 0000", the packet is to be redirected to a cache system identified as "Cache0." Alternatively, the Redirection Destination field may specify a particular bucket number (that is assigned to a particular cache system via a separate redirection table). The Redirection Destination field may alternatively indicate which server is to receive the packet, irregardless of the action field.

The "don't care" values may be used to mask one or more portion(s) of the actual packet. This feature allows selection of specific bit portions of a packet for each entry. For a particular entry, the selected bit portions of a packet have to match a particular entry within the TCAM to apply a redirection action associated with the particular entry to the matching packet. For example, an entry of the TCAM may have "don't care" values for most of the header portions of the packet, except for the entire source address. For this entry, only the source address of a packet is relevant for determining redirection. The entries within the same TCAM do not have to have the same masked (or "don't care") bits. For instance, each entry may correspond to different portions of a packet's source address, source port number, destination address, destination port number, and/or a protocol. Examples of protocols include the UDP or TCP protocol.

Figure 5A:
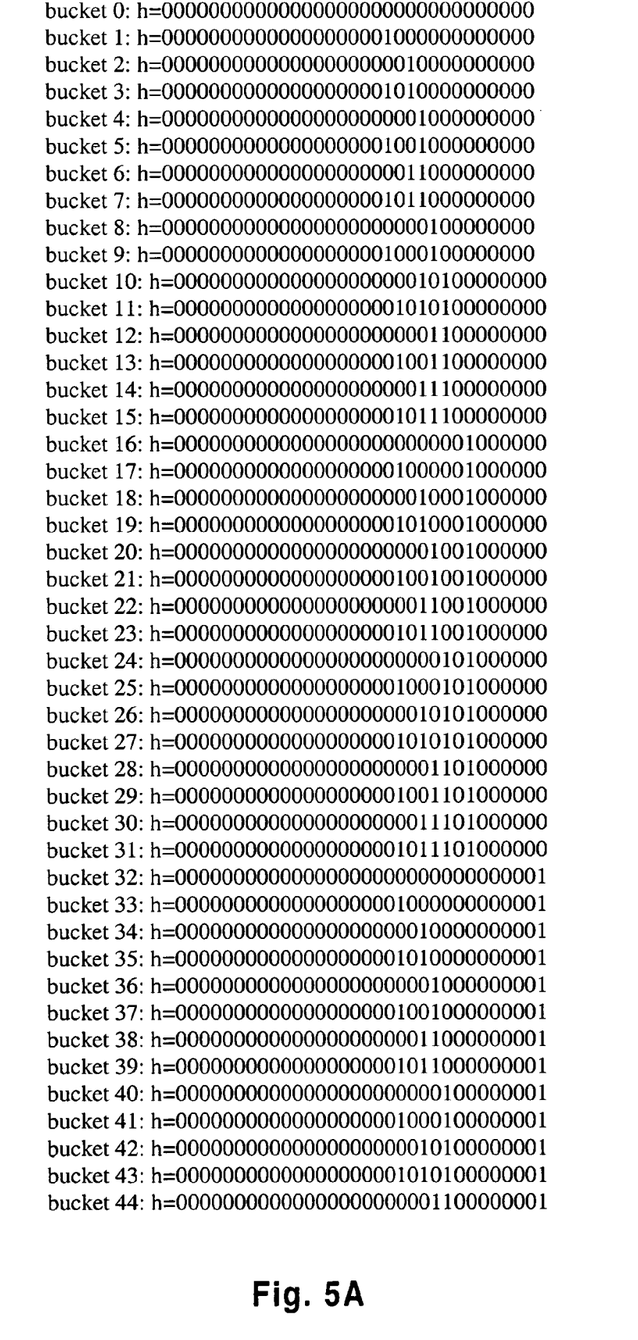
FIGS. 5A and 5B illustrate a specific TCAM configuration in accordance with a first embodiment of the present invention.
Figure 5B:
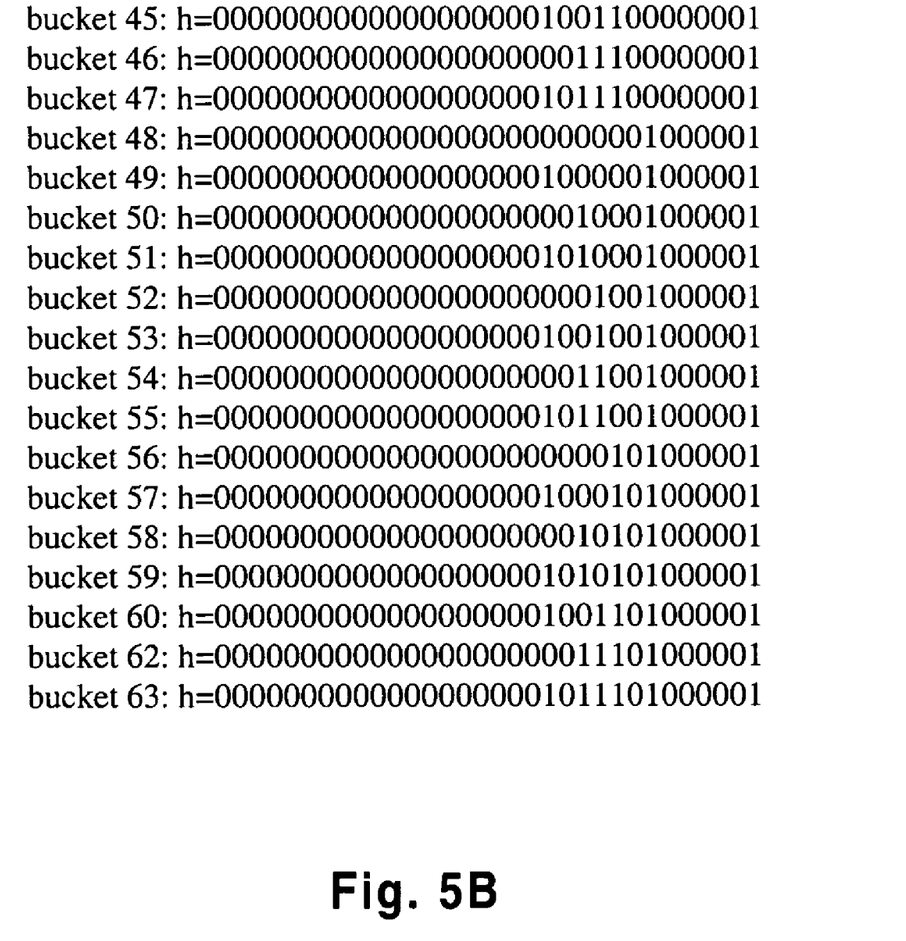

The TCAM may be set up using any suitable traffic distribution techniques. That is, any suitable load balancing techniques may be incorporated to determine how to distribute traffic. Two example TCAM setups that seem to work well are described below with reference to FIGS. 5A through 6C. These configurations includes 64-bucket and 128-bucket "hash masks", respectively, and have been mathematically calculated to evenly distribute traffic for each "traffic bucket". A "bucket" is generally a portion of the total traffic. For example, in the 64-bucket case, the traffic is divided into 64 portions. In these two TCAM configurations, the relevant bits of the packet are the four bytes of the destination address. Some of the destination address bits are masked for each configuration. In the example of FIGS. 5A–5B, the mask "don't care" bits are equal to "11111111111111111110100010111110," where a "1" represents a masked bit and a "0" represents an unmasked bit. In the FIGS. 6A–6C example, the mask "don't care" bits equal "11111111111111111110100010111010." In either of these two TCAM configurations, the buckets may then be evenly distributed among the available cache systems to obtain even traffic distribution across the cache systems. Preferably, a cache identification is specified for each entry, rather than a bucket number.

After the TCAM is set up or configured, a packet may then be received (e.g., into the switch) in operation 304. At least a portion of the received packet is then input into the TCAM in operation 306. It is then determined in operation 308 whether the TCAM specifies a "redirect". That is, when the packet portion is input into the TCAM, the TCAM outputs a result (e.g., an action and redirection destination field) for an entry that has a Bits-To-Match field that matches the input packet portion. In the illustrated embodiment, the output results specifies an action, such as redirect, and a redirection destination field, such as a cache system identification. If the TCAM specifies a redirect action, the packet is then redirected to the cache system specified by the TCAM in operation 310. If the TCAM does not specify a redirect action, the packet is not redirected, but is forwarded to the destination address specified by the packet in operation 312. Of course, other actions may be specified by the TCAM and then performed on the packet. For example, the packet may be dropped or modified. The traffic distribution procedure then returns to operation 304, where a next packet is then received and handled.

The above described traffic distribution mechanisms of the present invention may also be utilized in conjunction with the flow protection mechanisms described in co-pending U.S. patent application Ser. No. 09/476,188 by Kwok et al., entitled METHODS AND APPARATUS FOR REDIRECTING NETWORK TRAFFIC, filed on 3 Jan. 2000 and traffic assignment mechanisms are described in concurrently filed U.S. patent application Ser. No. 09/608,549 filed 30 Jun. 2000 by Tiwana et al., entitled METHODS AND APPARATUS FOR SLOW-STARTING A WEB CACHE SYSTEM, which applications are herein incorporated by reference in their entirety. The flow protection mechanism of the former application generally prevent traffic from being disrupted when a CS enters or exits the cluster. Likewise, the assignment mechanisms of the latter application allow a CS to enter or exit a cluster without disrupting traffic (e.g., by a CS becoming overloaded). These two mechanisms together provide significant flexibility in CS arrangements. For example, one may easily upgrade a CS cluster by adding a high-power CS and/or taking a low-power CS away without causing significant traffic disruption. By way of another example, a cluster may have CS with widely varying capacity since mechanisms for intelligent assigning and/or shedding buckets from a CS are provided. Additionally, a lower incidence of traffic disruptions contributes to the transparency aspect of the CS's. In sum, the traffic distribution mechanisms of the present invention may easily incorporate the flow protection and assignment mechanisms of these two co-pending patent applications.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of distributing packets among a plurality of cache systems, the method comprising:
   configuring a content addressable memory (CAM) to indicate distribution of received packets based on a load balancing technique to a plurality of cache systems that each spoof a destination indicated by the received packets;
   receiving a packet;
   inputting at least a portion of the packet into CAM; and
   obtaining a result from the CAM to indicate whether to redirect the received packet to a selected cache system and to indicate to which cache system selected from among the plurality of cache systems the received packet is to be redirected if the CAM also indicates that the received packet is to be redirected;
   redirecting the received packet to the selected cache system when the CAM indicates to redirect the received packet; and
   sending the received packet to a destination indicated by the received packet when the CAM does not indicate to redirect the received packet.

2. A method as recited in claim 1, wherein the result indicates to redirect the packet from being sent to a destination specified in the received packet.

3. A method as recited in claim 2, wherein the result includes a cache system device identification corresponding to the selected device to which the received packet is to be sent.

4. A method as recited in claim 1, wherein the content addressable memory is a ternary content addressable memory.

5. A method as recited in claim 1, wherein the portion(s) of the received packet input into the content addressable memory is selected from a group consisting of a destination address, a destination port, a source address, a source port, and a protocol.

6. A method as recited in claim 1, wherein the TCAM includes a plurality of entries, and each entry includes a bits-to-match field, an action field, and a redirection destination field.

7. A method as recited in claim 6, wherein the redirection destination field identifies a cache system.

8. A method as recited in claim 7, wherein the action field indicates whether the received packet is to be redirected.

9. A method for facilitating traffic distribution among a plurality of devices, the method comprising generating a plurality of entries within a content addressable memory, each entry including a set of bit values that correspond to at least a portion of a packet and each entry including one or more destination fields indicating where to send a packet that matches the entry's set of bit values and indicating whether to redirect the packet from a destination indicated by the packet, wherein the CAM is configured to distribute received packets to the plurality of cache systems based on a load balancing technique.

10. A method as recited in claim 9, wherein the destination fields include an action field indicating whether to redirect the packet from a destination indicated by the packet itself.

11. A method as recited in claim 10, wherein the destination fields include a destination identifier indicating a device to which the packet is to be redirected.

12. A method as recited in claim 9, wherein the set of bits values include at least a 1 or a 0 value and a "don't care" value.

13. A method as recited in claim 9, wherein the content addressable memory is ternary.

14. A computer system operable to distribute packets among a plurality of cache systems, comprising:
   a first memory;
   a content addressable memory; and
   a processor coupled to the first memory and the content addressable memory,
   wherein at least one of the first memory and the processor are adapted to provide:
      configuring a content addressable memory (CAM) to indicate distribution of received packets based on a load balancing technique to a plurality of cache systems that each spoof a destination indicated by the received packets;
      receiving a packet;
      inputting at least a portion of the packet into the content addressable memory; and
      obtaining result from the content addressable memory (CAM) to indicate whether to redirect the received packet to a selected cache system and to indicate to which cache system selected from among the plurality of cache systems the received packet is to be redirected if the CAM also indicates that the received packet is to be redirected, wherein the CAM is configured to distribute received packets to the plurality of cache systems based on a load balancing technique;
      redirecting the received packet to the selected cache system when the CAM indicates to redirect the received packet; and
      sending the received packet to a destination indicated by the received packet when the CAM does not indicate to redirect the received packet.

15. A computer system as recited in claim 14, wherein the result indicates to redirect the packet from being sent to a destination specified in the received packet.

16. A computer system as recited in claim 15, wherein the result includes a cache system identification corresponding to the selected cache system to which the received packet is to be sent.

17. A computer system as recited in claim 14, wherein the content addressable memory is a ternary content addressable memory.

18. A computer system as recited in claim 14, wherein the at least a portion of the received packet is selected from a group consist of a destination address, a destination port, a source address, a source port, and a protocol.

19. A computer system as recited in claim 14, wherein the content addressable memory includes a plurality of entries, and each entry includes a bits-to-match field, an action field, and a redirection destination field.

20. A computer system as recited in claim 19, wherein the redirection destination field identifies a cache system.

21. A computer system as recited in claim 20, wherein the action field indicates whether the received packet is to be redirected.

22. A computer system operable to facilitate traffic distribution among a plurality of cache systems, comprising:
   a first memory;
   a content addressable memory; and
   a processor coupled to the first memory and the content addressable memory (CAM),
   wherein at least one of the first memory and the processor are adapted to provide generating a plurality of entries within the content addressable memory, each entry including a set of bit values that correspond to at least a portion of a packet and each entry including one or more destination fields indicating where to send a packet that matches the entry's set of bit values and indicating whether to redirect the packet from a destination indicated by the packet, wherein the CAM is configured to distribute received packets to the plurality of cache systems based on a load balancing technique.

23. A computer system as recited in claim 22, wherein the destination fields include an action field indicating whether to redirect the packet from a destination indicated by the packet itself.

24. A computer system as recited in claim 23, wherein the destination fields include a destination identifier indicating a cache system to which the packet is to be redirected.

25. A computer system as recited in claim 22, wherein the set of bits values include at least a 1 or a 0 value and a "don't care" value.

26. A computer system as recited in claim 22, wherein the content addressable memory is ternary.

27. A computer program product for distributing traffic, the computer program product comprising:
  at least one computer readable medium;
  computer program instructions stored within the at least one computer readable product configured to cause a cache system to:
    configure a content addressable memory (CAM) to indicate distribution of received packets based on a load balancing technique to a plurality of cache systems that each spoof a destination indicated by the received packets;
    receive a packet;
    input at least a portion of the packet into a content addressable memory; and
    obtain a result from the content addressable memory (CAM) to indicate whether to redirect the received packet to a selected cache system and to indicate to which cache system selected from among the plurality of cache systems the received packet is to be redirected if the CAM also indicates that the received packet is to be redirected, wherein the CAM is configured to distribute received packets to the plurality of cache systems based on a load balancing technique;
    redirect the received packet to the selected cache system when the CAM indicates to redirect the received packet; and
    send the received packet to a destination indicated by the received packet when the CAM does not indicate to redirect the received packet.

28. A computer program product for distributing traffic, the computer program product comprising:
  at least one computer readable medium;
  computer program instructions stored within the at least one computer readable product configured to generate a plurality of entries within a content addressable memory, each entry including a set of bit values that correspond to at least a portion of a packet and each entry including one or more destination fields indicating where to send a packet that matches the entry's set of bit values and indicating whether to redirect the packet from a destination indicated by the packet, wherein the CAM is configured to distribute received packets to a plurality of devices based on a load balancing technique.

29. An apparatus for distributing traffic comprising:
  a means for configuring a content addressable memory (CAM) to indicate distribution of received packets based on a load balancing technique to a plurality of cache systems that each spoof a destination indicated by the received packets;
  a means for receiving a packet;
  a means for inputting at least a portion of the packet into a content addressable memory; and
  a means for obtaining a result from the content addressable memory to indicate whether to redirect the received packet to a selected cache system or to forward the received packet to a destination specified by the received packet and to indicate to which cache system selected from among the plurality of cache systems the received packet is to be redirected if the CAM also indicates that the received packet is to be redirected, wherein the CAM is configured to distribute received packets to the plurality of cache systems based on a load balancing technique; and
  a means for sending the received packet to the indicated cache system.

30. An apparatus for distributing traffic comprising a means for generating plurality of entries within a content addressable memory, each entry including a set of bit values that correspond to at least a portion of a packet and each entry including one or more destination fields indicating where to send a packet that matches the entry's set of bit values and indicating whether to redirect the packet from a destination indicated by the packet, wherein the CAM is configured to distribute received packets to the plurality of cache systems based on a load balancing technique.

31. A computer program as recited in claim 27, wherein the result indicates to redirect the packet from being sent to a destination specified in the received packet.

32. A computer program as recited in claim 31, wherein the result includes a cache system identification corresponding to the selected cache system to which the received packet is to be sent.

33. A computer program as recited in claim 27, wherein the content addressable memory is a ternary content addressable memory.

34. A computer program as recited in claim 27, wherein the portion(s) of the received packet input into the content addressable memory is selected from a group consisting of a destination address, a destination port, a source address, a source port, and a protocol.

35. A computer program as recited in claim 27, wherein the TCAM includes a plurality of entries, and each entry includes a bits-to-match field, an action field, and a redirection destination field.

36. A computer program as recited in claim 35, wherein the redirection destination field identifies a cache system.

37. A computer program as recited in claim 36, wherein the action field indicates whether the received packet is to be redirected.

* * * * *